United States Patent
Kano et al.

(10) Patent No.: US 11,551,495 B2
(45) Date of Patent: Jan. 10, 2023

(54) INFORMATION PROCESSING APPARATUS, AUTHENTICATION SYSTEM, AND INFORMATION PROCESSING METHOD

(71) Applicant: TOYOTA JIDOSHA KABUSHIKI KAISHA, Toyota (JP)

(72) Inventors: Hirokazu Kano, Nagoya (JP); Masatoshi Hayashi, Nisshin (JP); Reita Kamei, Nagoya (JP); Namika Hara, Kameyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/231,082

(22) Filed: Apr. 15, 2021

(65) Prior Publication Data

US 2021/0327179 A1    Oct. 21, 2021

(30) Foreign Application Priority Data

Apr. 20, 2020   (JP) .............................. JP2020-074616

(51) Int. Cl.
  *G07C 9/00*   (2020.01)

(52) U.S. Cl.
  CPC ............. *G07C 9/00309* (2013.01); *G07C 2009/00396* (2013.01); *G07C 2009/00769* (2013.01)

(58) Field of Classification Search
  None
  See application file for complete search history.

(56) References Cited

U.S. PATENT DOCUMENTS

| | | | |
|---|---|---|---|
| 9,688,247 B1* | 6/2017 | Jayaraman | H04L 9/32 |
| 9,741,186 B1* | 8/2017 | Lemke | H04W 12/069 |
| 10,553,056 B2* | 2/2020 | Shirai | G07C 9/00309 |
| 11,263,843 B2* | 3/2022 | Shirai | G07C 9/00309 |
| 2012/0254955 A1* | 10/2012 | Suginaka | G06F 21/34 726/4 |
| 2013/0237174 A1* | 9/2013 | Gusikhin | H04W 4/90 455/404.1 |
| 2014/0120905 A1* | 5/2014 | Kim | H04W 4/80 455/426.1 |
| 2017/0243424 A1* | 8/2017 | Shirai | H04W 12/06 |
| 2017/0249794 A1* | 8/2017 | Davis | G07C 9/00309 |
| 2021/0255688 A1 | 8/2021 | Kurata et al. | |
| 2022/0083463 A1* | 3/2022 | Muchherla | G06F 12/0848 |

FOREIGN PATENT DOCUMENTS

| | | |
|---|---|---|
| CN | 106408702 A | 2/2017 |
| JP | 2014-190047 A | 10/2014 |
| WO | 2019/244648 A1 | 12/2019 |

* cited by examiner

*Primary Examiner* — Carlos Garcia
(74) *Attorney, Agent, or Firm* — Sughrue Mion, PLLC

(57) ABSTRACT

An information processing apparatus for managing an electronic key compatible with a locking/unlocking apparatus, the information processing apparatus comprises a controller configured to: acquire terminal data that is data for notifying of a state of a first mobile terminal that uses the electronic key, and transmit, based on the terminal data, the electronic key corresponding to the first mobile terminal to a second mobile terminal different from the first mobile terminal.

12 Claims, 8 Drawing Sheets

TERMINAL DATA

| DATE/TIME INFORMATION | TERMINAL ID | AUXILIARY TERMINAL ID | STATUS DATA |
|---|---|---|---|
| ... | M001 | M002 | ... |
| ... | M002 | M001 | ... |
| ... | M003 | M004 | ... |
| ... | M004 | M003 | ... |
| ... | ... | ... | ... |

FIG. 3

INFORMATION PROCESSING APPARATUS, AUTHENTICATION SYSTEM, AND INFORMATION PROCESSING METHOD

CROSS REFERENCE TO RELATED APPLICATION

This application claims priority to Japanese Patent Application No. 2020-074616, filed on Apr. 20, 2020, incorporated herein by reference in its entirety.

BACKGROUND

Technical Field

The present disclosure relates to a technology of locking/unlocking using an electronic key.

Description of the Related Art

A system allowing locking/unlocking of a vehicle with an electronic key has been developed. With such a system, emergency method is often prepared for possible battery exhaustion. For example, Patent document 1 discloses a system by which an electronic key whose battery ran out can be charged by near-field wireless communication.

PATENT LITERATURE

Patent document 1: Japanese Patent Laid-Open No. 2014-190047

SUMMARY

In a case where a vehicle uses an electronic key, the vehicle cannot be unlocked when a terminal becomes unusable due to battery exhaustion or the like. There is a demand to enable emergency locking/unlocking in such a case by alternative method.

The present disclosure has been made in view of the above circumstances, and an object thereof is to enable emergency locking/unlocking in a locking/unlocking system that uses an electronic key.

The present disclosure in its one aspect provides an information processing apparatus for managing an electronic key compatible with a locking/unlocking apparatus, the information processing apparatus comprising a controller configured to: acquire terminal data that is data for notifying of a state of a first mobile terminal that uses the electronic key, and transmit, based on the terminal data, the electronic key corresponding to the first mobile terminal to a second mobile terminal different from the first mobile terminal.

The present disclosure in its another aspect provides an authentication system comprising a locking/unlocking apparatus configured to authenticate a predetermined mobile terminal by an electronic key, and a server apparatus configured to manage the electronic key used by the mobile terminal, wherein the locking/unlocking apparatus includes a first controller configured to authenticate the mobile terminal based on the electronic key received from the mobile terminal, and the server apparatus includes a second controller configured to receive terminal data that is data for notifying of a state of a first mobile terminal, and transmit, based on the terminal data transmitted from the first mobile terminal, the electronic key corresponding to the first mobile terminal to a second mobile terminal.

The present disclosure in its another aspect provides an information processing method that is performed by an information processing apparatus that manages an electronic key compatible with a locking/unlocking apparatus, the information processing method comprising: acquiring terminal data that is data for notifying of a state of a first mobile terminal that uses the electronic key; and transmitting, based on the terminal data, the electronic key corresponding to the first mobile terminal to a second mobile terminal different from the first mobile terminal.

Furthermore, as another aspect, there may be cited a program for causing a computer to execute the information processing method described above or a non-transitory computer-readable storage medium storing the program.

According to the present disclosure, emergency locking/unlocking is enabled in a locking/unlocking system that uses an electronic key.

BRIEF DESCRIPTION OF THE DRAWINGS

FIG. 3 is a diagram illustrating an example of terminal data according to the first embodiment;

DESCRIPTION OF THE EMBODIMENTS

Figure 1:
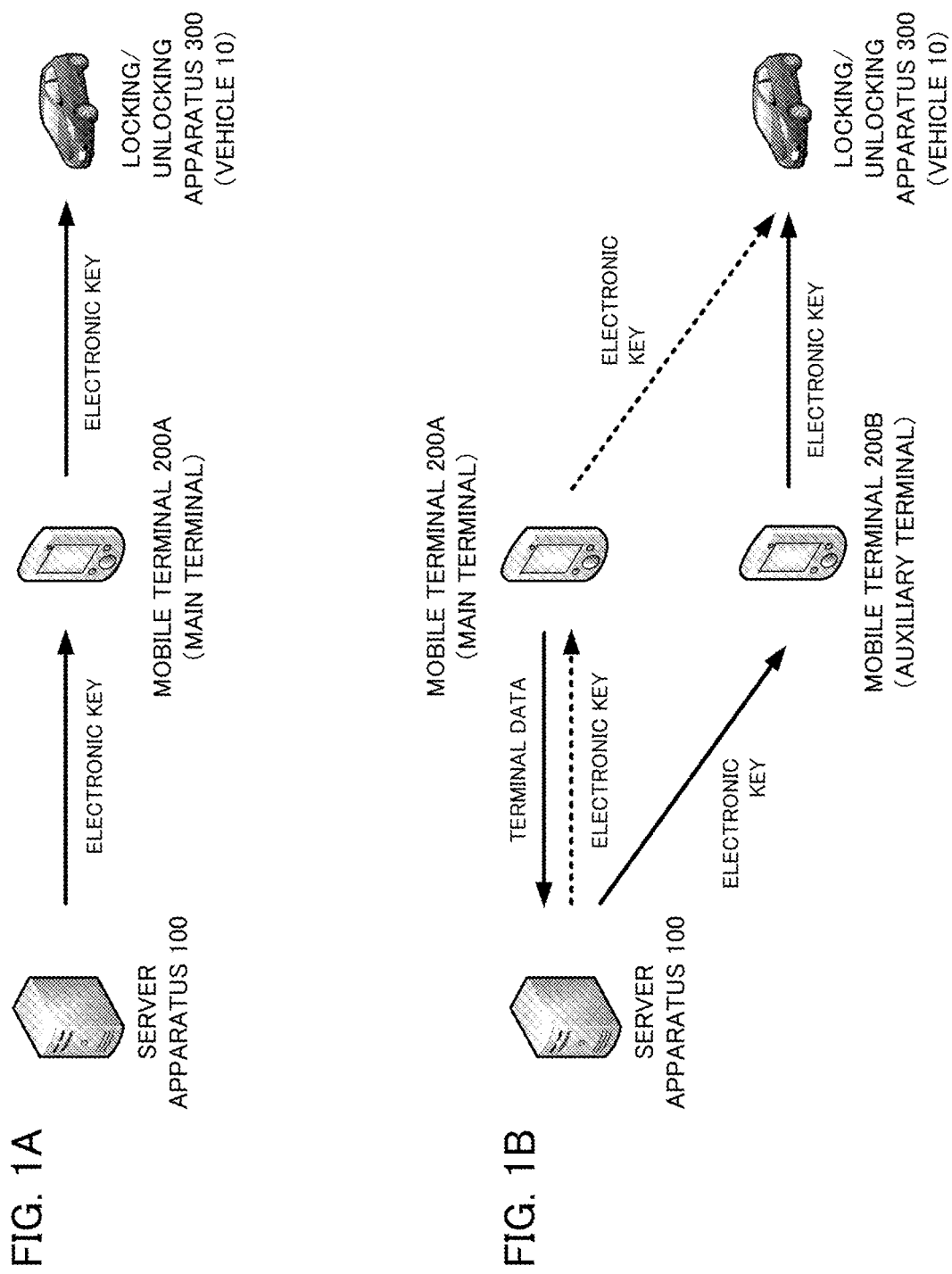
FIGS. 1A and 1B are outline diagrams of an authentication system according to a first embodiment.

An authentication system according to a present embodiment is a system that includes a server apparatus, a first mobile terminal, a second mobile terminal, and a locking/unlocking apparatus mounted in a vehicle.

The server apparatus is an apparatus that manages an electronic key for receiving authentication from the locking/unlocking apparatus. Normally, the electronic key is transmitted from the server apparatus to the first mobile terminal, and is transmitted from the first mobile terminal to the vehicle (the locking/unlocking apparatus).

However, in a case where the first mobile terminal becomes dysfunctional for some reason, such as battery exhaustion, a user loses the method to unlock the vehicle.

An information processing apparatus (the server apparatus) according to the present disclosure provides methods for handling such a situation.

A first mode of the present disclosure is an information processing apparatus that manages an electronic key compatible with a locking/unlocking apparatus.

Specifically, there is included a control unit configured to acquire terminal data that is data for notifying of a state of a first mobile terminal that uses the electronic key, and transmit, based on the terminal data, the electronic key corresponding to the first mobile terminal to a second mobile terminal different from the first mobile terminal.

The locking/unlocking apparatus according to the present mode is typically an apparatus that is mounted in a vehicle, and includes a function of authenticating a user by using an electronic key. Locking/unlocking of a door and ignition control are enabled by successful authentication. In a normal operation, the information processing apparatus transmits the electronic key to the first mobile terminal.

The information processing apparatus is able to acquire the terminal data that is data for notifying of the state of the first mobile terminal. Then, that the first mobile terminal is not usable or will not be usable in the future is estimated based on the terminal data, and in such a case, the corresponding electronic key is transmitted to the second mobile terminal.

According to such a configuration, backup method for when the electronic key is not usable may be provided to the user.

Additionally, the terminal data may be generated by the first mobile terminal or by another apparatus. In the former case, the terminal data is used as data (heartbeat) for notifying that the first mobile terminal is in a normal state. In the latter case, the terminal data is used as data for notifying of occurrence of abnormality in the first mobile terminal. In either case, the information processing apparatus is able to determine, based on the terminal data, that the first mobile terminal is dysfunctional (or will possibly become dysfunctional).

Additionally, the second mobile terminal may be a mobile terminal that is specified in advance by the first mobile terminal.

Furthermore, the information processing apparatus may further include a storage configured to store an association between the first mobile terminal and the second mobile terminal.

By registering a reliable terminal in advance, transmission of the electronic key to an apparatus not intended by a user may be prevented.

Furthermore, the terminal data may include data about a remaining amount of battery of the first mobile terminal.

Still further, the control unit may transmit the electronic key to the second mobile terminal in a case where the remaining amount of battery of the first mobile terminal is at or below a threshold.

By transmitting the electronic key to the second mobile terminal in advance based on the remaining amount of battery, a situation where a battery completely runs out may be coped with.

Furthermore, the control unit may transmit the electronic key to the second mobile terminal in a case where the terminal data fails to be acquired at a predetermined timing.

In a case where the terminal data is used as the heartbeat, and acquisition of the terminal data is interrupted, it is estimated that the first mobile terminal stopped functioning. By transmitting the electronic key in such a case, backup method may be provided even after the first mobile terminal becomes dysfunctional.

Furthermore, the terminal data may be data indicating the fact that the first mobile terminal is not able to transmit the electronic key to the locking/unlocking apparatus.

In this manner, the terminal data may be data for notifying of occurrence of abnormality. Such terminal data does not have to be directly transmitted from the first mobile terminal to the server apparatus. For example, such terminal data may be transmitted to the server apparatus via the second mobile terminal.

Furthermore, the control unit may transmit the electronic key to the second mobile terminal, with reception of the terminal data from other than the first mobile terminal as a trigger.

This is because, in a case where the terminal data related to the first mobile terminal is received from other than the first mobile terminal, it can be estimated that there is occurrence of abnormality in the first mobile terminal.

A second mode of the present disclosure is an authentication system including the locking/unlocking apparatus and the information processing apparatus (the server apparatus). The locking/unlocking apparatus includes a first control unit, and the server apparatus includes a second control unit.

A third mode of the present disclosure is an information processing method that is performed by the information processing apparatus according to the first mode.

A fourth mode of the present disclosure is an authentication system including the first mobile terminal, the second mobile terminal, and the information processing apparatus (the server apparatus). The first mobile terminal includes a first control unit, the second mobile terminal includes a second control unit, and the server apparatus includes a third control unit.

In the authentication system, the first control unit may further perform a process of transmitting the terminal data that is associated with the subject terminal to the second mobile terminal, and the second control unit may relay the terminal data to the server apparatus.

If, for some reason, the first mobile terminal is not able to perform communication, the terminal data may be transmitted to the server apparatus via the second mobile terminal.

Furthermore, the first control unit may further perform a process of transmitting the terminal data that is associated with the subject terminal to the second mobile terminal by near-field wireless communication, and the second control unit may transmit the terminal data to the server apparatus over a wide area network.

Even in a case where the first mobile terminal is dysfunctional, near-field wireless communication such as NFC, for example, may possibly be used. In such a case, the terminal data may be transmitted to the second mobile terminal by near-field wireless communication.

Furthermore, the first control unit may further perform a process of encoding the terminal data that is associated with the subject terminal into visible data, and the second control unit may decode the terminal data that is encoded, and transmit the terminal data to the server apparatus over the wide area network.

The visible data is a character string, an image, a bar code, a two-dimensional code or the like, for example. By converting the terminal data into visible data and loading the same into the second mobile terminal, the terminal data may be transmitted without using a communication function.

In the following, embodiments of the present disclosure will be described with reference to the drawings. Configurations of the following embodiments are merely examples, and the present disclosure is not limited to the configurations of the embodiments.

First Embodiment

An outline of an authentication system according to a first embodiment will be given with reference to FIGS. 1A and 1B. The system according to the present embodiment includes a server apparatus 100, a plurality of mobile terminals 200A and 200B, and a locking/unlocking apparatus 300 that is mounted in a vehicle 10.

The server apparatus 100 is an apparatus that manages electronic keys of a plurality of vehicles 10.

The mobile terminal 200A is a computer (a first mobile terminal; hereinafter referred to also as "main terminal") that is used by a user who rides in the vehicle 10. The mobile terminal 200B is an auxiliary computer (a second mobile terminal; hereinafter referred to also as "auxiliary terminal") that is used when the mobile terminal 200A becomes dysfunctional. For example, the mobile terminal 200B may be a computer that is used by the family of the user.

Hereinafter, when not necessary to distinguish between the main terminal and the auxiliary terminal, the mobile terminals 200A and 200B will be collectively referred to as "mobile terminal(s) 200".

The locking/unlocking apparatus 300 is a computer that is mounted in the vehicle 10, and the locking/unlocking apparatus 300 performs unlocking of the vehicle based on a result of authentication of the mobile terminal 200. Additionally, to unlock a vehicle is to unlock the door and enable starting of an engine (or turning on of power).

FIG. 1A is a diagram illustrating a flow of data during normal operation.

The server apparatus 100 issues, in response to a request from the mobile terminal 200A, an electronic key for unlocking the vehicle 10 that is linked to the mobile terminal 200A, and transmits the electronic key to the mobile terminal 200A. The mobile terminal 200A unlocks the vehicle 10 by transmitting the electronic key to the locking/unlocking apparatus 300 mounted in the vehicle 10.

In such a mode, a user is not able to unlock the vehicle 10 when the mobile terminal 200A becomes dysfunctional (due to battery exhaustion or the like).

FIG. 1B is a diagram illustrating a flow of data in the present embodiment.

The mobile terminal 200A periodically transmits the terminal data for notifying of the state of the subject terminal to the server apparatus 100. The server apparatus 100 determines, based on the received terminal data, that the mobile terminal 200A will possibly become dysfunctional, and in such a case, the server apparatus 100 transmits the electronic key to the mobile terminal 200B that is specified in advance. That is, a transmission route of the electronic key is switched from a route indicated by a dotted line to a route indicated by a solid line.

According to such a system, a user is able to unlock the vehicle 10 using the auxiliary terminal even in a case where the main terminal becomes unusable due to battery exhaustion, for example.

Structural elements of the system will be described in detail.

The server apparatus 100 may be configured by a general-purpose computer. That is, the server apparatus 100 may be configured as a computer that includes processors such as a CPU and a GPU, main memories such as a RAM and a ROM, and auxiliary memories such as an EPROM, a hard disk drive and a removable medium. Additionally, the removable medium may be an USB memory or a disk recording medium such as a CD or a DVD, for example. The auxiliary memory stores an operating system (OS), various programs, various tables and the like, and may implement a function matching a predetermined object as described below, by executing a program that is stored therein. However, one or some or all of functions may alternatively be implemented by a hardware circuit such as an ASIC or an FPGA.

Figure 2:
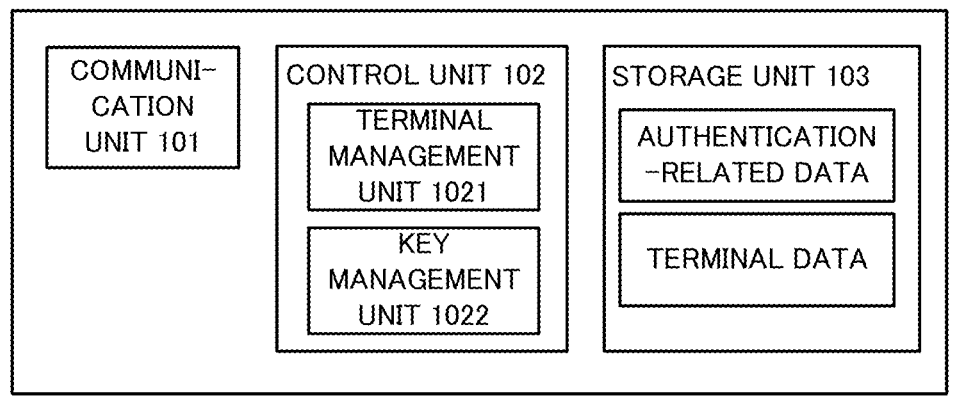
FIG. 2 is a block diagram schematically illustrating an example of a server apparatus.
Figure 4:
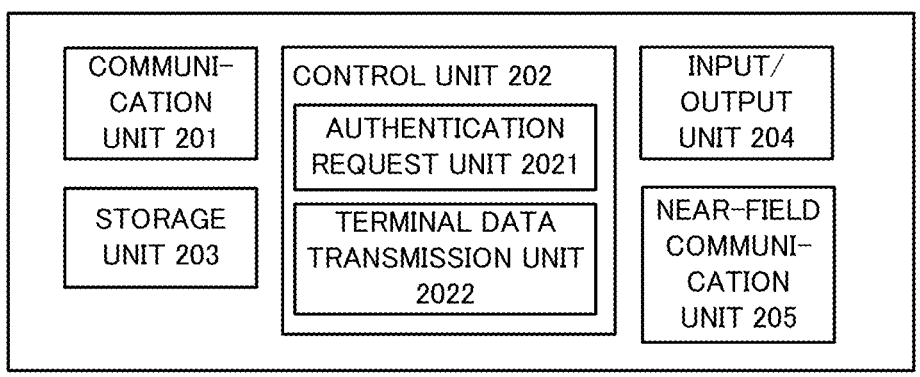
FIG. 4 is a block diagram schematically illustrating an example of a mobile terminal.
Figure 5:
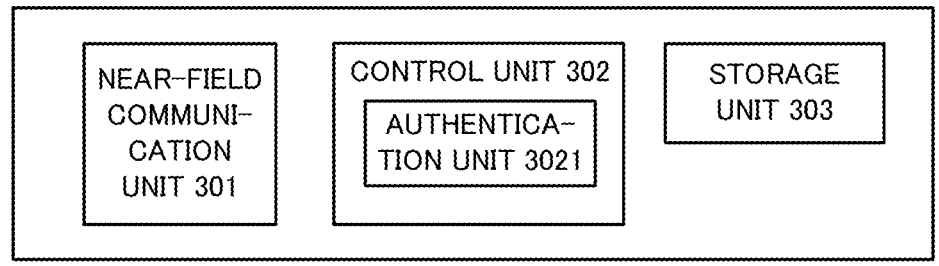
FIG. 5 is a block diagram schematically illustrating an example of a locking/unlocking apparatus.

FIG. 2 is a block diagram schematically illustrating an example of a configuration of the server apparatus 100 illustrated in FIGS. 1A and 1B. The server apparatus 100 includes a communication unit 101, a control unit 102, and a storage unit 103.

The communication unit 101 is an interface for communicating with the mobile terminal 200 over a network.

The control unit 102 is a unit configured to control the server apparatus 100. The control unit 102 is a CPU, for example.

The control unit 102 includes, as functional modules, a terminal management unit 1021 and a key management unit 1022. Each functional module may be implemented by the CPU executing a program stored in storage such as a ROM.

The terminal management unit 1021 manages a plurality of mobile terminals 200 under its management.

In the present embodiment, the terminal management unit 1021 periodically acquires, from the plurality of mobile terminals 200 under its management, data (terminal data) for notifying of a state of the corresponding mobile terminal. The terminal data includes a terminal ID, an auxiliary terminal ID, and status data.

The terminal ID is an identifier of the mobile terminal 200 transmitting the terminal data. Furthermore, the auxiliary terminal ID is an identifier of an auxiliary mobile terminal 200 that is used in a case where the mobile terminal 200 in question becomes unusable. The status data is, in the present embodiment, a value that expresses the remaining amount of battery of the mobile terminal 200 in percentage.

The terminal data that is acquired by the terminal management unit 1021 is stored in the storage unit 103 described later. FIG. 3 is a diagram illustrating an example of the terminal data according to the first embodiment.

The key management unit 1022 manages electronic keys that are used by the plurality of mobile terminals 200. The electronic key is electronic data for receiving authentication from a predetermined locking/unlocking apparatus 300.

Normally, the key management unit 1022 acquires an electronic key corresponding to a mobile terminal 200 in response to a request from the mobile terminal 200, and transmits the electronic key to the mobile terminal 200.

An electronic key that is stored in advance may be acquired, or an electronic key may be dynamically generated. For example, an electronic key that is valid only in a predetermined time slot, an electronic key for which the number of times of use is specified, an electronic key that can be used only by a predetermined mobile terminal, or the like may be generated.

Furthermore, in the case where one mobile terminal 200 accesses a plurality of locking/unlocking apparatuses 300, the key management unit 1022 may manage a plurality of electronic keys for respective mobile terminals 200.

Furthermore, the key management unit 1022 performs a process of determining, based on received terminal data, that a mobile terminal 200A as a main terminal will possibly become dysfunctional, and of transmitting the electronic key to a mobile terminal 200B as an auxiliary terminal.

The storage unit 103 is a unit configured to store information, and is a storage medium such as a RAM, a magnetic disk or a flash memory. Various programs to be executed by the control unit 102, data to be used by the programs, and the like are stored in the storage unit 103. Furthermore, data for generating the electronic key described above (authentication-related data) and the terminal data described above are stored in the storage unit 103.

Next, a description will be given of the mobile terminal 200.

For example, the mobile terminal 200 is a small computer such as a smartphone, a mobile phone, a tablet terminal, a personal digital assistant or a wearable computer (such as a smartwatch). The mobile terminal 200 includes a communication unit 201, a control unit 202, a storage unit 203, an input/output unit 204, and a near-field communication unit 205.

The communication unit 201 is a communication unit configured to connect the mobile terminal 200 to a network. In the present embodiment, communication may be performed with another apparatus (such as the server apparatus 100) over a network by using a mobile communications service such as 4G or LTE.

The control unit 202 is a unit configured to control the mobile terminal 200. For example, the control unit 202 is a microcomputer. The control unit 202 may execute programs stored in the storage unit 203 described later by a CPU to implement functions thereof.

The control unit 202 includes, as functional modules, an authentication request unit 2021 and a terminal data transmission unit 2022. Each functional module may be implemented by the CPU executing a program stored in a storage (such as a ROM).

The authentication request unit 2021 performs a process of acquiring an electronic key from the server apparatus 100, and a process of transmitting the electronic key to the locking/unlocking apparatus 300 to request for locking/unlocking.

First, the authentication request unit 2021 performs the process of acquiring the electronic key. In the present embodiment, the authentication request unit 2021 transmits, to the server apparatus 100, data requesting for issuance of the electronic key (hereinafter "key issuance request"). The electronic key generated by the server apparatus 100 is transmitted to the mobile terminal 200 via the communication unit 201.

Next, the authentication request unit 2021 provides an operation screen to the user via the input/output unit 204 described later, and generates a request for locking or unlocking, based on an operation performed by the user. For example, the authentication request unit 2021 outputs, on a touch panel display, an icon for performing unlocking or an icon for performing locking, and generates data requesting for locking or unlocking, based on an operation performed by the user. The data is transmitted to the locking/unlocking apparatus 300 together with the electronic key.

Additionally, the operation by the user does not have to be performed via the touch panel display, and may be performed via a hardware switch or the like, for example.

Additionally, in the case where the mobile terminal 200 does not possess an electronic key, a locking operation and an unlocking operation via the operation screen are not possible.

The electronic key to be acquired by the mobile terminal 200 may be a fixed key or a one-time key. In either case, data (authentication information) to be checked against the electronic key is stored in advance in the locking/unlocking apparatus 300.

The terminal data transmission unit 2022 generates data (terminal data) for notifying of the state of the subject terminal, and periodically transmits the data to the server apparatus. Additionally, in the present embodiment, the terminal data transmission unit 2022 includes data indicating the remaining amount of battery of the subject terminal in the terminal data, and transmits the data to the server apparatus 100.

The storage unit 203 is a unit configured to store information, and is a storage medium such as a RAM, a magnetic disk or a flash memory. The electronic key transmitted from the server apparatus 100, the terminal data generated by the terminal data transmission unit 2022, various programs to be executed by the control unit 202, data and the like are stored in the storage unit 203.

The input/output unit 204 is a unit configured to receive an input operation performed by a user, and to present information to the user. Specifically, a touch panel and controller for the touch panel, and a liquid crystal display and controller for the liquid crystal display are included. In the present embodiment, the touch panel and the liquid crystal display are formed as one touch panel display.

The near-field communication unit 205 is an interface for performing near-field wireless communication with the locking/unlocking apparatus 300. The near-field communication unit 205 performs communication over a short distance (about several centimeters) by using a predetermined wireless communication standard.

In the present embodiment, the near-field communication unit 205 performs data communication by Bluetooth (registered trademark) Low Energy standard (hereinafter "BLE"). Additionally, the present embodiment cites BLE as an example, but other wireless communication standards may also be used. For example, Near Field Communication (NFC), Ultra Wideband (UWB), Wi-Fi (registered trademark) and the like may also be used.

The locking/unlocking apparatus 300 is an apparatus for locking and unlocking the door of a predetermined facility, institution or building, and is an apparatus that forms a part of a smart key system. In the present embodiment, the locking/unlocking apparatus 300 is an apparatus that is mounted in the vehicle 10.

The locking/unlocking apparatus 300 includes a function of performing near-field wireless communication with a mobile terminal 200 and authenticating the mobile terminal 200, and a function of locking/unlocking an electronic lock based on a result of authenticating the mobile terminal 200.

Additionally, a term "locking/unlocking" is used in the present embodiment, but the locking/unlocking apparatus 300 may also enable starting of the engine of the vehicle 10 based on the authentication result.

The locking/unlocking apparatus 300 includes a near-field communication unit 301, a control unit 302, and a storage unit 303.

The near-field communication unit 301 is a unit configured to perform communication with the mobile terminal 200 by the same communication standard as that used by the near-field communication unit 205.

The control unit 302 is a module that performs control of performing near-field wireless communication with a mobile terminal 200 via the near-field communication unit 301 and authenticating the mobile terminal 200, and control of locking/unlocking an electronic lock based on an authentication result. For example, the control unit 302 is a microcomputer.

The control unit 302 includes, as a functional module, an authentication unit 3021. The functional module may be implemented by the CPU executing a program stored in a storage (such as a ROM).

The authentication unit 3021 performs authentication of a mobile terminal 200 based on the electronic key transmitted from the mobile terminal 200. Specifically, the authentication information stored in the storage unit 303 and the electronic key transmitted from the mobile terminal 200 are checked against each other, and authentication success is determined in the case where the two match. In the case where the pieces of information do not match, authentication failure is determined. In the case where the authentication unit 3021 succeeds in authenticating the mobile terminal 200, a command to lock/unlock is transmitted to the electronic lock of the vehicle 10.

Additionally, the method of authentication used by the authentication unit 3021 may be a method of simply comparing pieces of authentication information with each other to verify identity, or may be a method that uses asymmetric cryptography.

The storage unit 303 is a unit configured to store information, and is a storage medium such as a RAM, a magnetic disk or a flash memory. Authentication information to be checked against the electronic key that is transmitted from the mobile terminal 200, various programs to be executed by the control unit 302, data and the like are stored in the storage unit 303.

Figure 6:
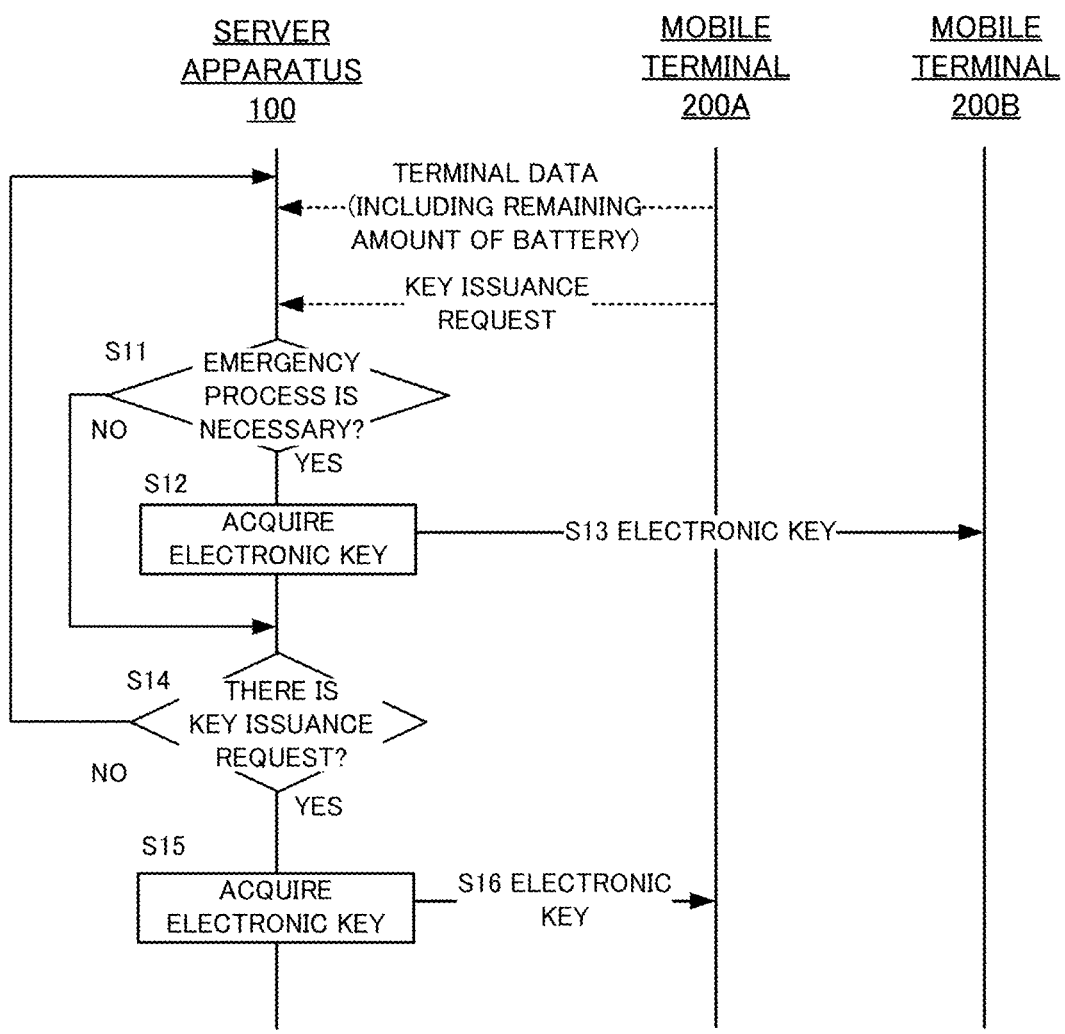
FIG. 6 is a flow diagram of data that is transmitted/received by each structural element.

FIG. 6 is a diagram illustrating a flow of data that is transmitted/received among the structural elements described above.

The mobile terminal 200A as a main terminal periodically transmits the terminal data to the server apparatus 100. As described above, the terminal data includes the remaining amount of battery of the subject terminal and the identifier of an auxiliary terminal for emergency use (in this case, the mobile terminal 200B). The terminal data is received by the server apparatus 100 (the terminal management unit 1021), and is stored.

Furthermore, the mobile terminal 200A transmits the key issuance request to the server apparatus 100 at an arbitrary timing.

In step S11, the server apparatus 100 determines whether the terminal data is already received from the mobile terminal 200A and whether or not there is a possibility of the mobile terminal 200A becoming dysfunctional. For example, in the case where the remaining amount of battery of the mobile terminal 200A indicated by the terminal data is below a predetermined threshold (for example, 5%), the server apparatus 100 determines that the mobile terminal 200A will possibly become dysfunctional, and performs an emergency process.

In the case where the emergency process is to be performed, the process proceeds to step S12, and the key management unit 1022 acquires the electronic key corresponding to the mobile terminal 200A. When the emergency process is started, the acquired electronic key is transmitted to the auxiliary terminal (the mobile terminal 200B) specified by the terminal data (step S13). The user of the mobile terminal 200A is thus enabled to access the locking/unlocking apparatus 300 using the mobile terminal 200B that is the auxiliary terminal.

Next, the server apparatus 100 (the key management unit 1022) determines whether or not the key issuance request is received (step S14). In the case where the key issuance request is received, the server apparatus 100 (the key management unit 1022) acquires the electronic key corresponding to the mobile terminal 200A (step S15), and transmits the same to the mobile terminal 200A (step S16). In the case where the key issuance request is not received, a waiting state for data is reached.

The user of the mobile terminal 200A is thereby enabled to access the locking/unlocking apparatus 300 using the mobile terminal 200A.

As described above, with the authentication system according to the first embodiment, in a case where there is a possibility that the mobile terminal 200 that uses an electronic key will stop functioning due to battery exhaustion, the server apparatus 100 automatically transmits the electronic key to an auxiliary terminal that is specified in advance. A situation where the vehicle 10 cannot be unlocked may thereby be prevented.

Additionally, in the present embodiment, the server apparatus 100 performs the emergency process based on the remaining amount of battery of the mobile terminal 200, but the server apparatus 100 may also perform the emergency process in a case where the terminal data fails to be received at a predetermined timing. For example, in the case where it is arranged that the terminal data is to be periodically transmitted, if transmission of the terminal data is not performed for a specific period of time or longer, battery exhaustion may be determined and the emergency process may be started.

Furthermore, in the present embodiment, the electronic key that is transmitted to the main terminal and the electronic key that is transmitted to the auxiliary terminal are the same, but it is also possible to grant different authorizations to the electronic keys. For example, in step S12, an electronic key that is granted the minimum necessary authorization may be acquired. For example, the minimum necessary authorization may be an authorization to enable charging of the main terminal (for example, an authorization to unlock the door of the vehicle 10 and to enable use of a charge port inside the vehicle).

Second Embodiment

In the first embodiment, the mobile terminal 200 periodically transmits data indicating the state of the mobile terminal 200 (i.e. the terminal data) to the server apparatus 100. In contrast, a second embodiment is a mode in which terminal data corresponding to the mobile terminal 200A as the main terminal is transmitted to the server apparatus 100 via the mobile terminal 200B as the auxiliary terminal in a case where the mobile terminal 200A becomes dysfunctional.

In the second embodiment, the terminal data is an identifier of an NFC module of the mobile terminal 200.

Figure 7:
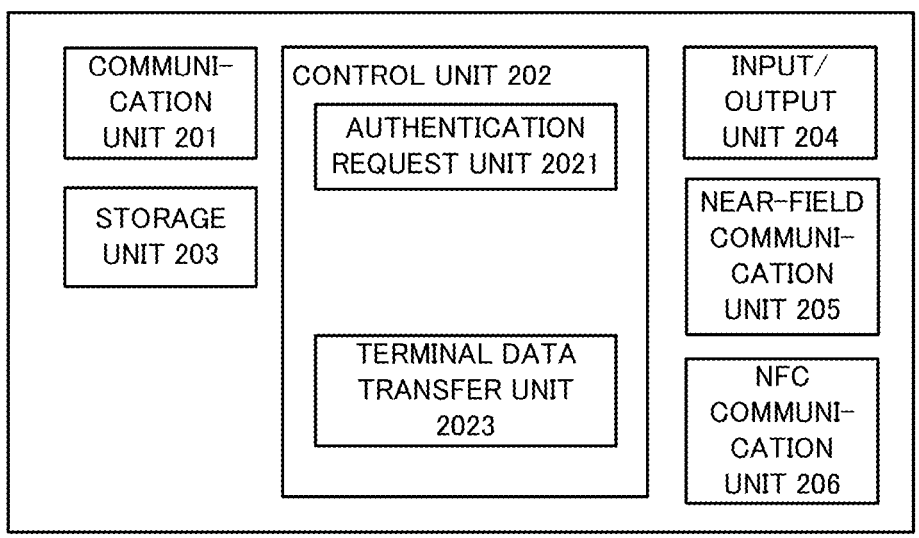
FIG. 7 is a block diagram schematically illustrating an example of a mobile terminal according to a second embodiment.

FIG. 7 is a system configuration diagram illustrating an example of the configuration of the mobile terminal 200 according to the second embodiment. In the second embodiment, the mobile terminal 200 further includes an NFC communication unit 206. Furthermore, the control unit 202 further includes a terminal data transfer unit 2023.

The NFC communication unit 206 is a module for performing transmission/reception of data by non-contact communication using Near Field Communication (NFC). The NFC communication unit 206 is capable of operating on low power, and may wirelessly transmit its own identifier (hereinafter "NFC identifier") even in a state where the operating system of the mobile terminal 200 cannot be started.

The terminal data transfer unit 2023 transfers the terminal data acquired by NFC communication to the server apparatus 100. That is, in the second embodiment, the terminal data is data indicating that the corresponding mobile terminal 200 is dysfunctional.

Figure 8:
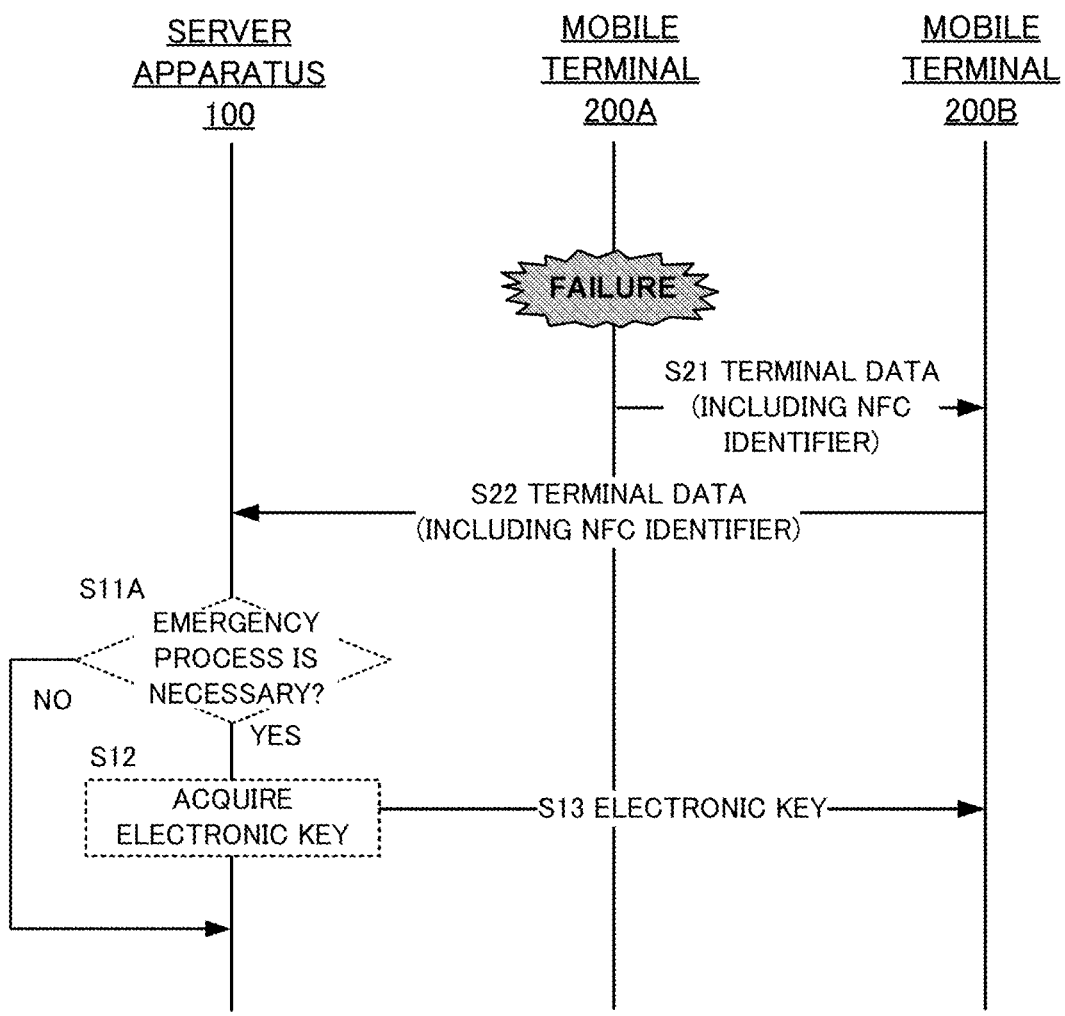
FIG. 8 is a flow diagram of data that is transmitted/received by each structural element in the second embodiment.

FIG. 8 is a data flow diagram of the second embodiment.

In the case where the mobile terminal 200A as the main terminal becomes dysfunctional, the user operates the mobile terminal 200B as the auxiliary terminal to enable NFC communication, and then, brings the NFC communication unit of the main terminal into contact with the NFC communication unit of the auxiliary terminal. The NFC identifier of the mobile terminal 200A is thus transmitted, as the terminal data, to the mobile terminal 200B (step S31).

When the terminal data (the NFC identifier) is received by the NFC communication unit 206 of the mobile terminal 200B, the terminal data transfer unit 2023 compares the NFC identifier that is stored in advance (the NFC identifier of the mobile terminal 200 that is paired) against the received NFC identifier. In the case where the two match, the terminal data transfer unit 2023 transfers the received terminal data to the server apparatus 100 (step S22).

In the case where the NFC identifier is included in the received terminal data, and the apparatus that transmitted the terminal data is not the mobile terminal 200 that corresponds to the terminal data, the server apparatus 100 starts the emergency process (step S11A).

The processes in steps S12 and S13 are the same as those in the first embodiment.

Additionally, in the second embodiment, the terminal data is not periodically transmitted from the mobile terminal 200A as the main terminal to the server apparatus 100, and thus, the server apparatus 100 is not able to link the main terminal and the auxiliary terminal based on the terminal data. Accordingly, data for linking the main terminal and the auxiliary terminal may be stored in advance in the server apparatus 100.

Furthermore, in the second embodiment, data linking the NFC identifier and the mobile terminal 200 may be stored in advance in the server apparatus 100.

As described above, according to the second embodiment, even in a case where a main function (such as operation of the operating system) of the main terminal is stopped, issuance of the electronic key may be requested to the server apparatus 100 via the auxiliary terminal. Particularly, by using the NFC communication function, issuance of the key may be triggered even in a state where the power is not sufficient.

Additionally, also in the second embodiment, as in the first embodiment, the mobile terminal 200 may include a component that directly transmits the terminal data corresponding to the subject terminal to the server apparatus 100.

Modification of Second Embodiment

In the second embodiment, the terminal data is transmitted from the main terminal to the auxiliary terminal by using NFC communication, but interfaces other than NFC communication may also be used.

For example, an embodiment of using a two-dimensional bar code is conceivable.

In this case, the mobile terminal 200A as the main terminal encodes the identifier of the subject terminal into a two-dimensional bar code, and outputs an image. Furthermore, the mobile terminal 200B as the auxiliary terminal reads the two-dimensional bar code with a camera, and decodes the same. Then, the mobile terminal 200B may generate the terminal data corresponding to the main terminal based on the decoding result.

Additionally, an example is described here where an image is used, but a character string may alternatively be used. For example, the mobile terminal 200A as the main terminal may encode the identifier of the subject terminal into a character string with a predetermined function and output the same, and the mobile terminal 200B as the auxiliary terminal may acquire the input character string and decode the same.

MODIFIED EXAMPLES

The above-described embodiments are merely an example, and the present disclosure can be modified and implemented within a range not deviating from the gist of the present disclosure.

For example, the processing and the units described in the present disclosure can be implemented while the processing and the units are freely combined unless technical inconsistency arises.

In addition, the processing(s) explained as carried out by a single device may be carried out by a plurality of devices. Alternatively, the processing(s) explained as carried out by different devices may be carried out by a single device. In a computer system, whether each function is achieved by what kind of hardware configuration (server configuration) can be changed in a flexible manner.

The present disclosure can also be achieved by supplying a computer program to a computer that implements the functions explained in the above-mentioned embodiments and modifications, and by reading out and executing the program by one or more processors of the computer. Such a computer program may be supplied to the computer by a non-transitory computer readable storage medium that can be connected with a system bus of the computer, or may be supplied to the computer through a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, any type of medium suitable for storing electronic commands.

What is claimed is:

1. An information processing apparatus for managing an electronic key compatible with a locking/unlocking apparatus, the information processing apparatus comprising a controller configured to:
   acquire terminal data representing an operational status of a first mobile terminal that uses the electronic key to access the locking/unlocking apparatus, and
   transmit, responsive to a transmission condition based on the terminal data, a copy of the electronic key used by the first mobile terminal to a second mobile terminal different from the first mobile terminal, the second mobile terminal being thereby enabled to access the locking/unlocking apparatus,
   wherein the transmission condition is one of:
      the terminal data including data indicating that a remaining amount of battery of the first mobile terminal is at or below a threshold, and
      the terminal data failing to be acquired at a predetermined timing.

2. The information processing apparatus according to claim 1, wherein the second mobile terminal is a mobile terminal that is specified in advance by the first mobile terminal.

3. The information processing apparatus according to claim 2, further comprising a storage configured to store an association between the first mobile terminal and the second mobile terminal.

4. The information processing apparatus according to claim 1, wherein the terminal data includes data indicating that the first mobile terminal is not able to transmit the electronic key to the locking/unlocking apparatus.

5. The information processing apparatus according to claim 4, wherein the controller acquires the terminal data via the second mobile terminal.

6. An authentication system comprising a locking/unlocking apparatus configured to authenticate a first mobile terminal and a second mobile terminal by an electronic key, and a server apparatus configured to manage the electronic key used by the first and second mobile terminals, wherein:
the locking/unlocking apparatus includes a first controller configured to authenticate the first and second mobile terminals based on the electronic key received therefrom, and
the server apparatus includes a second controller configured to:
receive terminal data representing an operational status of the first mobile terminal, and
transmit to the second mobile terminal, responsive to a transmission condition based on the terminal data, a copy of the electronic key used by the first mobile terminal to access the locking/unlocking apparatus, the second mobile terminal being thereby enabled to access the locking/unlocking apparatus,
the transmission condition is one of:
the terminal data including data indicating that a remaining amount of battery of the first mobile terminal is at or below a threshold, and
the terminal data failing to be acquired at a predetermined timing.

7. The authentication system according to claim 6, wherein the second mobile terminal is a mobile terminal that is specified in advance by the first mobile terminal.

8. The authentication system according to claim 7, wherein the server apparatus further includes a storage configured to store an association between the first mobile terminal and the second mobile terminal.

9. The authentication system according to claim 6, wherein the terminal data includes data indicating that the first mobile terminal is not able to transmit the electronic key to the locking/unlocking apparatus.

10. The authentication system according to claim 9, wherein the second controller acquires the terminal data via the second mobile terminal.

11. An information processing method that is performed by an information processing apparatus that manages an electronic key compatible with a locking/unlocking apparatus, the information processing method comprising:
acquiring terminal data representing an operational status of a first mobile terminal that uses the electronic key to access the locking/unlocking apparatus; and
transmitting, responsive to a transmission condition based on the terminal data, a copy of the electronic key used by the first mobile terminal to a second mobile terminal different from the first mobile terminal, the second mobile terminal being thereby enabled to access the locking/unlocking apparatus,
wherein the transmission condition is one of:
the terminal data including data indicating that a remaining amount of battery of the first mobile terminal is at or below a threshold, and
the terminal data failing to be acquired at a predetermined timing.

12. The information processing method according to claim 11, further comprising acquiring an association between the first mobile terminal and the second mobile terminal.

* * * * *